Sept. 9, 1958     J. K. MOSHER     2,851,055
FLUID CONTROL VALVE
Filed March 26, 1953     3 Sheets-Sheet 1
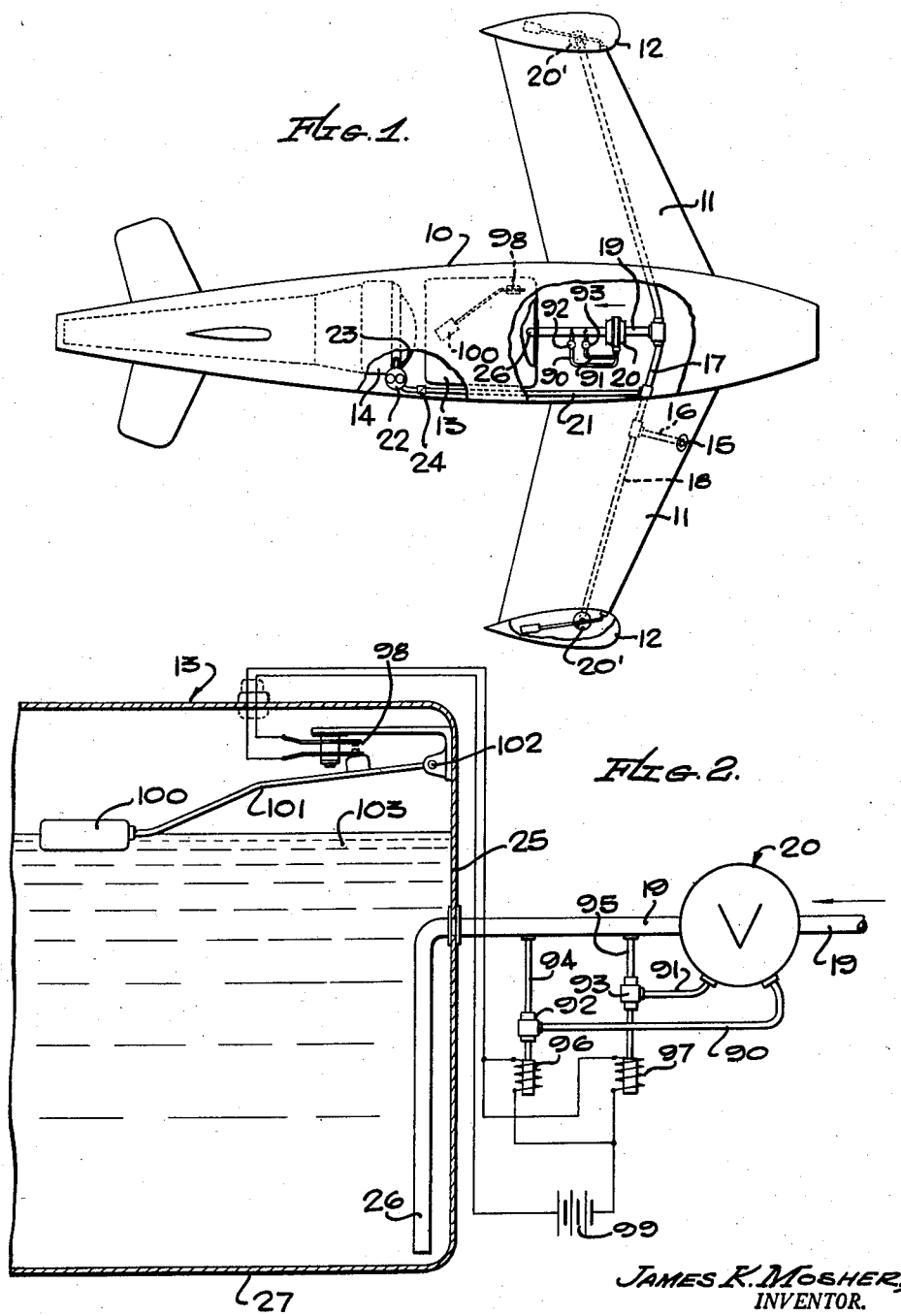
JAMES K. MOSHER,
INVENTOR.
BY
ATTORNEY Sept. 9, 1958        J. K. MOSHER        2,851,055
FLUID CONTROL VALVE
Filed March 26, 1953        3 Sheets-Sheet 2
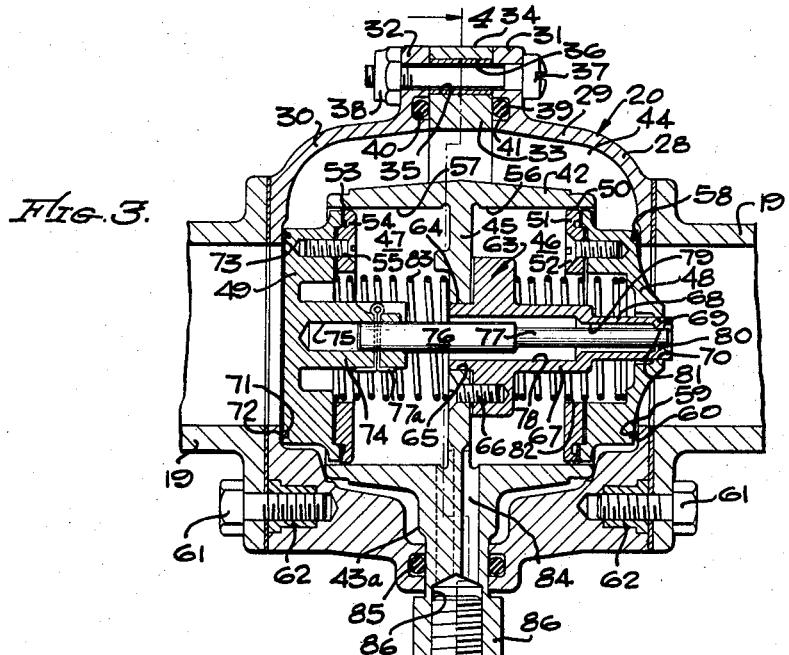
FIG. 3.
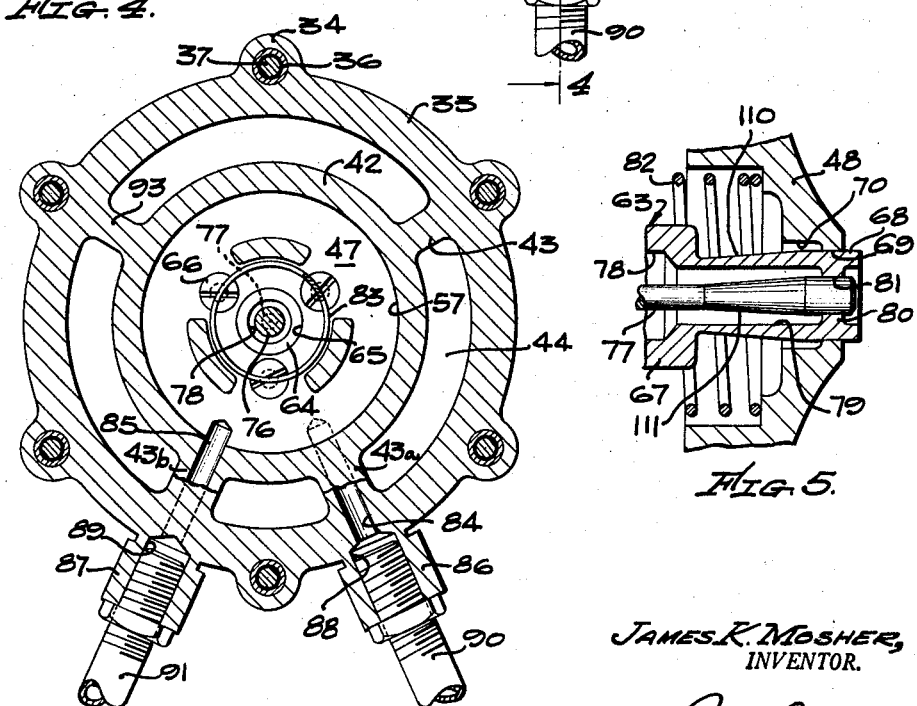
FIG. 4.
FIG. 5.
JAMES K. MOSHER,
INVENTOR.
BY 
ATTORNEY United States Patent Office 2,851,055
Patented Sept. 9, 1958

2,851,055

FLUID CONTROL VALVE

James K. Mosher, Pasadena, Calif., assignor to Schulz Tool and Manufacturing Co., San Gabriel, Calif., a corporation of California Application March 26, 1953, Serial No. 344,753

24 Claims. (Cl. 137—400)

This invention relates generally to fluid control valves and more particularly to liquid flow control valves.

While the invention has particular utility in connection with liquid fluid control for aircraft fuel tanks wherein liquid level must be maintained, and will be shown and described in connection therewith, it is to be expressly understood that said invention shall not be limited therewith.

Heretofore, difficulty has been experienced in properly filling aircraft fuel tanks inasmuch as fuel level must be maintained and flow to the tanks must be interrupted when such level is reached. When expendable fuel tanks are employed, valve mechanism employed therein must be preferably light in weight, efficient and reliable in operation and relatively economical in manufacture. In addition, simplicity of construction is an important factor in order to maintain efficient and reliable operation of such a mechanism. It is therefore an object of the present invention to provide fuel control valve means to satisfy these requirements and to overcome such prior difficulties.

The valve of this invention is primarily for purposes of fueling and defueling the aircraft fuel tanks including wing-tip tanks and other tanks such as tanks in the fuselage of the aircraft. Problems of safety are involved in the handling of high octane fuels used in modern aircraft. The fuel is pumped to the tanks under pressure and it is of primary importance that the fueling valve positively shut off when the tank is filled. The device of this invention is responsive to the filling of the tanks and is provided with a dual mechanism for shutting off the flow, either part of the dual mechanism being operative to effect termination of flow. The mechanism involves pressure chambers, the pressure in which is controlled by pilot valves responsive to the level of fuel in the tank, each pilot valve being individually operable to effect termination of flow of fuel such that either one or the other may fail, and yet termination of flow of fuel is nevertheless assured.

The valve mechanism provides for defueling, that is, the removal of the fuel from the tank through the valve in the reverse direction, and this may involve transfer of the fuel to other tanks. This defueling or transfer of fuel is preferably accomplished by placing the fuel in the tank under pressure so as to force the fuel out of the tank through the valve.

It is another object of the invention to provide a novel flow control valve that may be used to control both admission and extraction of liquid from a compartment.

It is a further object of the invention to provide a novel supporting and operating means for a valve member in a fluid control mechanism in order to desirably reduce the overall length of the unit and associated weight thereof.

It is still another object of the invention to provide a novel fluid control valve wherein differential pressure is utilized for the operation thereof and the effective area on which said pressure is adapted to operate is held to a minimum through use of suitable pistons and effective seals therefor.

It is another object of the invention to provide a valve mechanism having formed therein two variable pressure chambers in which pressure may accumulate for effecting valve closing operation, the valve closing operation being in response to accumulation of pressure in either one of the chambers.

It is another object of the invention to provide mechanism as in the foregoing object, wherein the pressure in the chambers is controlled by pilot valves responsive to level in a fuel tank, each pilot valve being individually operable to effect closure of the main valve.

It is another object of the invention to provide a novel flow control valve that may be operated while immersed in a suitable liquid.

It is a further object of the invention to provide a novel means for preventing damage or undue travel of valve members in a fluid control valve due to pressure surge conditions.

It is a further object of the invention to provide a valve mechanism having pressure chambers, the accumulation of pressure in which is operable to effect valve closure, the pressure chambers having fluid admission valves arranged to gradually restrict the admission of fluid to the chambers as the main valve closes in order to achieve a gentle closing action of the valve upon the termination of high rate flows of fluid.

It will be seen that the present invention has other objects, advantages, and features, some of which, with the foregoing, will be set forth in the following description in which certain embodiments of the invention have been selected for illustrative purposes only in the drawing, accompanying and forming a part of the present specification, and wherein:

Fig. 1 is a diagrammatic view showing a typical installation of the flow control valves of the present invention;

Fig. 2 is a schematic view showing the control means for one of the flow control valves;

Fig. 3 is a transverse sectional view of the flow control valve of the present invention;

Fig. 4 is a sectional view of the valve of Fig. 3 and taken substantially as indicated by line 4—4, Fig. 3;

Fig. 5 is an enlarged fragmentary sectional view showing a modified arrangement of the restricted orifice passages into the operating chambers of the valve mechanism;

Fig. 6 is a longitudinal sectional view showing another arrangement of the present fluid flow control valve;

Fig. 7 is an end view, partially in section, of the flow control valve of Fig. 6;

Fig. 8 is a fragmentary sectional view taken substantially as indicated by line 8—8, Fig. 7; and Fig. 9 is a schematic view showing the control means for the flow control valve of Fig. 6.

Referring to the drawing, in Fig. 1, the flow control valve of the present invention is shown in connection with the fuel system of a typical aircraft. This particular illustration is by way of example only, the flow control valves of the present invention being adapted for use in connection with a variety of conditions wherein the control of the flow of a suitable fluid is required.

As shown, an aircraft 10 has suitable wings 11, which carry wing tip fuel tanks indicated generally at 12. A fuel tank 13 is positioned in the fuselage of the aircraft and a suitable propulsion engine 14 is disposed in the aft portion of said fuselage. One of the wings 11 is provided with a suitable fuel filler opening 15 which extends to a conduit 16, the conduit 16 being connected to suitable branch conduits 17 and 18. A third branch conduit 19 is connected to the conduit 17 and extends rearwardly therefrom to the tank 13. The flow control valve of the present invention, as indicated generally at 20, is shown as being installed in the conduit 19, the branch conduits 17 and 18 extending outwardly through the wings 11 of the aircraft to be connected to other flow control valves indicated generally at 20', the valves 20' being preferably positioned in the lower section of the tanks 12.

An engine fuel feeder line 21 is connected to the branch conduit 17 and extends rearwardly, past the tank 13, to a suitable pump 22. The pump 22 is adapted to provide a rise in the pressure of the fuel contained in the conduits so that this fuel may be delivered under pressure to the engine 14, by way of a conduit 23. A check valve 24 is installed in the conduit 21 upstream from the pump 22. The present method of extraction of fuel from the tanks 12 and 13 by way of the flow control valves 20 and 20' is shown by way of example only and will be later described in detail.

As shown in Fig. 2, the conduit 19 extends to the valve 20 and, from the valve, extends through the wall 25 of the tank 13 and is bent downwardly as at 26, terminating adjacent the bottom wall 27 of the tank.

Referring now primarily to Figs. 3 and 4, the flow control valve 20 is shown in detail and comprises a substantially cylindrical housing 28 formed by substantially cup shaped portions 29 and 30 each of which are provided with outwardly extending flanges 31 and 32. An annular ring 33 is positioned intermediate the flanges 31 and 32, the ring 33 having outstanding tabs 34 with axially extending openings 35 therethrough. Bushings 36, of a material substantially harder than that of the ring 33, are positioned in the openings 35, and a bolt 37 is adapted to extend through the flanges 31 and 32 and through the bushing 36 to thereby clamp the ring 33 intermediate these flanges. A nut 38 engages the ends of the bolts 37. In order to provide a seal intermediate the flanges 31 and 32 and the ring 33, a pair of O rings 39 and 40 are disposed in annular grooves 41 in the flanges 31 and 32, the O rings 39 and 40 engaging the axial surfaces of the ring 33.

A baffle 42 is disposed axially within the housing 28 and spaced from the inner walls of the members 29 and 30 by means of suitable webs 43, these webs being formed integrally with the ring 33. A passage 44 is thus defined intermediate the inner surfaces of the housing 28 and the outer surface of the baffle 42.

The baffle 42 has a centrally disposed radially extending partition 45 which divides the space within the baffle into axially extending primary and secondary chambers 46 and 47 each having outwardly directed open ends. The ends of the chambers 46 and 47 are provided with primary and secondary valve members 48 and 49 which are axially slidably disposed therein. The primary valve member 48 has a peripheral seal 50 which is secured thereto by means of a retaining plate 51, secured thereto by means of suitable screws 52, and the secondary valve member 49 has a suitable seal 53 held in place by means of a retainer plate 54 which is secured to the valve member 49 by means of screws 55. The seals 50 and 53 are adapted to engage the inner cylindrical surfaces 56 and 57 of the chambers 46 and 47 respectively. The primary valve member 48 has an axially directed annular groove 58 in which a resilient seal member 59 is positioned, the seal member 59 being adapted to engage a seat 60 formed on one end of the cup portion 29 of the housing 28. A closure is thus provided intermediate the passage 44 and the conduit 19, the conduit 19 being retained on the valve 20 by means of suitable bolts 61 which are threadably engaged in bushings 62, the bushing 62 being detained in opening in the outer surfaces of the cup portions 29, the cup portion 30 being provided with a similar arrangement for supporting the portion of the conduit 19 extending from the valve 20 to the tank 13.

A central guide member 63 has a reduced diameter portion 64 which is adapted to be positioned in a centrally disposed opening 65 in the partition 45 and retained therein by means of suitable screws 66, extending through the partition 45, and making threadable engagement with the guide member 63. The guide member 63 has an enlarged portion which extends axially from the partition 45, has a reduced diameter portion 67 and a further reduced diameter portion 68, the portion 68 terminating slightly axially outwardly from the outer end of the valve member 48. The valve member 48 has a centrally disposed opening 69 which is relieved as at 70 to provide a short axial sliding bearing surface with the reduced diameter portion 68 of the guide member 63, the purpose of which will later be described.

The secondary valve member 49 has an axially extending annular groove 71 in which a resilient seal member 72 is positioned. The seal member 72 is adapted to engage a seat 73 to thus provide a seal intermediate the passage 44 and the portion of the conduit 19 extending to the tank 13. The valve member 49 is further provided with an axially extending, inwardly directed portion 74 which has an axial bore 75 in which a shaft 76 is adapted to be positioned and retained therein by means of a suitable cotter pin 77a. The shaft 76 has a reduced diameter portion 77 which extends axially and terminates adjacent the outer end of the reduced diameter portion 68 of the guide member 63. The shaft 76 and the extension 77 are spaced from bores 78 and 79 formed axially within the guide member 63, and an inwardly directed flange 80 extending from the bore 79 adjacent the outer end thereof to provide a short axial sliding bearing surface for the shaft portion 77.

A compression spring 82 extends intermediate the guide member 63 and the interior surface of the primary valve member 48 and a second compression spring 83 extends intermediate the partition 45 and the interior surface of the secondary valve member 49 to thereby normally bias the valve members 48 and 49 and their resilient seals 59 and 72 against the seats 60 and 73 respectively.

A pair of the webs 43, indicated generally at 43a and 43b and positioned adjacent the lower end of the valve 20, as shown in Fig. 4, are provided with radially extending bores 84 and 85, the bore 84 extending into the primary chamber 46 and the bore 85 extending into the secondary chamber 47. A pair of bosses 86 and 87 are formed on the outer periphery of the ring 33 and are provided with bores 88 and 89 respectively which communicate with the bores 84 and 85. Conduits 90 and 91 make threaded connections with the bores 88 and 89, these conduits, as shown primarily in Fig. 2, being adapted to extend to suitable pilot valves 92 and 93. The pilot valves 92 and 93 are connected through conduits 94 and 95 to the portion of the conduit 19 extending from the valve 20 to the tank 13, the purpose of which will later be described. The pilot valves 92 and 93 are of the normally open type thus providing communication between the conduits 90 and 94 and the conduits 91 and 95 respectively, and may be operated by means of suitable solenoids 96 and 97, these solenoids being controlled by means of a switch 98 positioned in the upper portion of the tank 13, a suitable supply of power 99 being provided therefor. The switch 98 is adapted to be closed by means of a float 100 having an arm 101 which is pivotally mounted as at 102 to the interior surface of the side wall 25 of the tank 13, so that when the liquid, indicated at 103, in the tank 13 reaches a predetermined selected level, the float 100 will rise, thus closing the switch 98 and energizing the solenoids 96 and 97 to thereby close the pilot valves 92 and 93.

In operation, when fuel is delivered through the filler opening 15 in one of the wings 11 of the aircraft, this fuel will pass under pressure through the conduits 17 and 19 to the face of the primary valve member 48. With the pilot valves 92 and 93 being normally open and being connected through the conduits 94 and 95 to a region of lower pressure which may be the portion of the conduit 19 extending from the valve 20 to the tank 13, the pressure in the chambers 46 and 47 will be lower than that within the conduit 19 thereby permitting the pressure of the liquid in the conduit 19 to act on the outer surfaces of the valve members 48 and 49 to cause these valve members to recede into the chambers 46 and 47 to thus open the passage 44 for communication with the conduit 19. The valve 48 opens first admitting fluid under pressure to the chamber 44 and this pressure then acts on the surface of member 49 which is exposed within chamber 44 to open the valve 49. High pressure liquid is bled into the chambers 46 and 47, through the centrally disposed restricted orifices 69 and 81 in the valve member 48 and the guide member 63 respectively, and into the respective chambers 46 and 47 by way of the interior of the valve member 48 in one instance and by way of the bores 78 and 79 in the guide member 63 in the other instance. The orifices thus provided through which high pressure liquid may flow into the chambers 46 and 47, are of a restricted nature due to the bearing arrangements and the flow from the chambers 46 and 47 are of an unrestricted nature, being through the bores 84 and 85 which extend to the pilot valves 92 and 93 and thereafter to a region of lower pressure.

The portion of the conduit 19 extending from the valve 20 to the tank 13 has been selected as the presently used region of pressure, this region being established due to the normal pressure drop in the liquid passing through the valve 20. It is to be understood, of course, that any suitable region may be used wherein the pressure is below that of the liquid in the conduit 19. When the switch 98 is closed by means of the float 100, the pilot valves 92 and 93 will thereby be closed and the flow from the chambers 46 and 47 and through the bores 84 and 85 will be shut off thus permitting the bleed of high pressure liquid into the chambers 46 and 47 to thereby increase the pressure in these chambers until an equalization of the pressures in the chambers and the pressure in the conduit 19 is approached, whereupon the springs 82 and 83 will urge the valve members 48 and 49 into engagement with their respective seats 60 and 73 thus closing the passage 44 from communication with the conduit 19 and terminating flow to the tank 13. The closing action of the springs is assisted by an increased pressure drop across the valve members as their seats are approached.

It may be seen that the effective area upon which the fluid pressure is adapted to act on the valve members 48 and 49 is held to a minimum through the use of piston like valve members rather than prior unsatisfactory diaphragms or the like, which were subject to corrosion and deterioration by fuel and other like liquids. The two point suspension for the valve members 48 and 49, these points being created by the engagement of the peripheral seals with the interior surfaces of the chambers 46 and 47 and the engagement of the central portion of the valve members with suitable guide means, reduces the overall length of the unit which would normally be necessary to prevent misalignment of the piston-like valve members 48 and 49.

Should either of the pilot valves 92 or 93 fail to operate, the chamber 46 or 47 controlled by the operating pilot valve will have its unrestricted outflow flow stopped, thereby permitting a build up in pressure therein to cause the associated valve member to close the communication between the passage 44 and the conduit 19 and to shut off the flow of liquid to the tank 13. The valve 20 is therefore fail-safe, as either of the valves 48 or 49 may terminate such flow and any small leak past the orifices 69 or 81 will merely flow through to the tank during the filling operation thereof. The provision of the two pilot valves 92 and 93 provides a safety factor in combination with the valve 20 in that each pilot valve is individually capable of causing a pressure to accumulate in one of the chambers of the valve 20 which will effect termination of fuel flow.

In Fig. 5, a modified arrangement for the centrally disposed guide means for the valve members 48 and 49 is shown. In this modification, the reduced diameter portion 68 of the guide member 63 has its outer surface inwardly tapered as at 110 and the reduced diameter portion 77 of the shaft 76 is provided with a tapered portion 111. These tapered portions 110 and 111 are provided in order to protect the valve members 48 and 49 against damage in the event of surges or sudden increases in liquid pressure in the conduit 19 upstream from the valve. In such event, as the valve members 48 and 49 start to open, the orifices about the sliding bearings 69 and 81 intermediate the valve member 48 and the reduced diameter portion 77 of the shafts 76 respectively, will be increased in area thus permitting a more rapid bleed of high-pressure liquid into the chambers 46 and 47 to thus provide a pressure cushion for the valve members and prevent these members from striking the inner surfaces of the chambers 46 and 47. The tapered members 110 and 111 gradually restrict the admission of fluid to the chambers 46 and 47 as the valves 48 and 49 close. The valve 20 may be one utilized for transfer of fuel at relatively high rates such as perhaps 200 gallons per minute. The sudden cutting off of the fluid flow at this rate may give rise to surge and pressure wave effects which might seriously damage the valve by closing it too rapidly and forcefully. The effect therefore, of the members 110 and 111 is to restrict the admission of fluid to the chambers 46 and 47 sufficiently as the valve members move towards closed position to effect a gentle but firm closing of the valves, eliminating danger of damage thereto.

In Figs. 6 through 9 inclusive, a modified arrangement of the present flow control valve is shown wherein like parts are indicated by single primed reference numerals. Specifically, this valve is as previously discussed in connection with the valve 20' positioned and secured to the lower interior surface of the wing tip tanks 12, the valve in each of the tanks being identical, and for purposes of illustration, the valve in the right hand tank being shown and connected to the conduit 18. As shown primarily in Figs. 6 and 7, the valve 20' comprises a body 120 having an axial bore 121 therein, one end of the bore 121 being provided with the cover closure member 122 which is secured to the body 120 by means of suitable screws 123. An O ring 124 is positioned in an annular groove 125 in the inner portion of the cover 122 to provide a seal intermediate the cover 122 and the axial bore 121. Liquid flow from the conduit 118 is adapted to flow past the valve member 48' and out through ports 126 in the periphery of the valve body 120 adjacent the primary valve member 48'.

Chambers 46' and 47', intermediate the valve members 48' and 49' and the valve member 49' and cover 122 respectively, may be connected to a region of lower pressure such as, for example, the interior of the tank 12, by way of conduits 90' and 91', pilot valves 92' and 93' being carried directly by an arm 101' to which a float 100' is attached. In this connection, it may be seen and should be understood that either of the valves 20 or 20' may be operated in connection with pilot valves that are either mechanically or electrically controlled, as shown in Figs. 2 and 9, and that the present invention is not to be limited to any specific operating mechanism for the pilot valves.

The operation of the valve 20' is substantially the size as the operation of the valve 20 with a restricted flow of high pressure liquid being delivered from the conduit 18 to the primary chamber 46 through the orifice 69'. With the pilot valve 92' being normally open when the liquid 103' in the tank 12 is below a predetermined level, there will be provided an unrestricted flow from the chamber 46' by way of the bore 84' in the body 120 of the valve and the conduit 90' to thus create a differential pressure across the primary valve member 48' and cause the valve member to open by receding into the chamber 46' thereby permitting a flow of liquid from the conduit 18, past the valve 48', and out through the openings 126. Likewise, the secondary valve member 49' will be maintained in the position shown in Fig. 6 when the pilot valve 93' is open. When the pilot valves 92' and 93' are closed by the rising of the float 100', liquid pressure in the chambers 46' and 47' will be increased by a bleed through the restricted orifices 69' and 81' to thereby force the valve members 48' and 49' rightwardly, as shown in Fig. 6, to thereby close the communication between the conduit 18 and the ports 126. Should either of the pilot valve 92' or 93' fail to operate, the primary valve member 48' will be still moved into engagement with its associated seat 60' due to the increase in pressure in either chamber 46' or 47'.

Fuel may be transferred from one tank to another, or the tanks may be defueled, and this is preferably by subjecting the interior of the tank to pressure to force the fuel out of the tank. Thus, if the tank 13 is subjected to pressure, the fuel therein would be forced out through valve 20 in the reverse direction, the pressure being sufficient to unseat the valve members 49 and 48.

When suction is applied to the system by the fuel pump 22, pressure will be reduced in the chambers 46 and 47 in the valve 20 and in the chambers 46' and 47' in the valve 20' to cause the valve members 48, 49, 48' and 49' to open, permitting fuel to be withdrawn from the tanks 12 and 13. At this time the pilot valves are closed. The engine and fuel pump are controlled by means not shown, and during operation of the engine and fuel pump the pilot valves may be controlled by means not shown actuatable from the pilot's cockpit.

From the foregoing description, the uses, advantages, and operation of the present invention will be readily understood by those skilled in the art to which the invention appertains. While there has been described certain embodiments of the invention, it is desired to emphasize the fact that the invention may be applied to various types of valve mechanisms, to have it understood that the examples given are merely illustrative, and that the invention is not to be limited to the details disclosed herein, but is to be accorded the full scope of the appended claims.

I claim:

1. In a fluid control valve: a valve body; means forming a bore within said body; fluid passage means through said body on the outside of said bore means; primary valve means positioned for movement within said body and adapted to occlude said passage means; secondary valve means positioned for movement within said body and arranged in cooperative relationship with said primary valve means, movement thereof being adapted to cause occlusion of said passage means, both said primary valve means and secondary valve means being arranged to move outwardly to sealing position in said valve body; chamber means formed within said body in association with said primary and secondary valve means; restricted passage means for delivery of high pressure fluid to said chamber means; relatively unrestricted passage means for connecting said chamber means to a region of lower pressure; and means to control fluid flow through said unrestricted passage means.

2. In a fluid control valve: a valve body; means forming a bore within said body; fluid passage means through said body on the outside of said bore means; primary valve means positioned for movement within said body and adapted to occlude said passage means; secondary valve means positioned for movement within said body and arranged in cooperative relationship with said primary valve means, movement thereof being adapted to cause occlusion of said passage means, both said primary valve means and secondary valve means being arranged to move outwardly to sealing position in said valve body; chamber means formed within said body in association with said primary and secondary valve means; restricted passage means for delivery of high pressure fluid to said chamber means; relatively unrestricted passage means for connecting said chamber means to a region of lower pressure; and means responsive to the presence of liquid in a compartment to control fluid flow through said unrestricted passage means.

3. In a fluid control valve: a valve body; fluid passage means through said body; primary valve means positioned for movement within said body and adapted to occlude said passage means; secondary valve means positioned for movement within said body and arranged in cooperative relationship with said primary valve means, movement thereof being adapted to cause occlusion of said passage means, both said primary valve means and secondary valve means being arranged to move outwardly to sealing position in said valve body; chamber means formed within said body in association with said primary and secondary valve means; variable restricted passage means, means whereby variation thereof is controlled in response to movement of said primary and secondary valve means, for delivery of high pressure fluid to said chamber means; relatively unrestricted passage means for connecting said chamber means to a region of lower pressure; and means to control fluid flow through said unrestricted passage means.

4. In a fluid control valve: a valve body; fluid passage means through said body; primary valve means positioned for movement within said body and adapted to occlude said passage means; secondary valve means positioned for movement within said body and arranged in cooperative relationship with said primary valve means, movement thereof being adapted to cause occlusion of said passage means, both said primary valve means and secondary valve means being arranged to move outwardly to sealing position in said valve body; chamber means formed within said body in association with said primary and secondary valve means; variable restricted passage means, means whereby variation thereof is controlled in response to movement of said primary and secondary valve means, for delivery of high pressure fluid to said chamber means; relatively unrestricted passage means for connecting said chamber means to a region of lower pressure; and means responsive to the presence of liquid in a compartment to control fluid flow through said unrestricted passage means.

5. In a fluid control valve: a valve body; means forming a bore within said body; fluid passage means through said body on the outside of said bore means; primary valve means positioned for movement within said body and adapted to occlude said passage means; secondary valve means positioned for movement within said body and arranged in cooperative relationship with said primary valve means, movement thereof being adapted to cause occlusion of said passage means, both said primary valve means and secondary valve means being arranged to move outwardly to sealing position in said valve body; a pair of chambers formed within said body, said primary and secondary valve means providing movable walls for each of said chambers; restricted passage means for delivery of high pressure fluid to each of said chambers; unrestricted passage means for connecting said chambers to a region of lower pressure; and means to selectively control fluid flow through said unrestricted passage means.

6. In a fluid control valve : a valve body; means formig a bore within said body; fluid passage means through said body on the outside of said bore means; primary valve means positioned for movement within said body and adapted to occlude said passage means; secondary valve means positioned for movement within said body and arranged in cooperative relationship with said primary valve means, movement thereof being adapted to cause occlusion of said passage means, both said primary valve means and secondary valve means being arranged to move outwardly to sealing position in said valve body; a pair of chambers formed within said body, said primary and secondary valve means providing movable walls for each of said chambers; restricted passage means for delivery of high pressure fluid to each of said chambers; unrestricted passage means for connecting said chambers to a region of lower pressure; and means responsive to the presence of liquid in a compartment to selectively control fluid flow through said unrestricted passage means.

7. In a fluid control valve: a valve body; fluid passage means through said body; primary valve means positioned for movement within said body and adapted to occlude said passage means; secondary valve means positioned for movement within said body and arranged in cooperative relationship with said primary valve means, movement thereof being adapted to cause occlusion of said passage means, both said primary valve means and secondary valve means being arranged to move outwardly to sealing position in said valve body; a pair of chambers formed within said body, said primary and secondary valve means providing movable walls for each of said chambers; variable restricted passage means, means whereby variation thereof is controlled in response to movement of said primary and secondary valve means, for delivery of high pressure fluid to each of said chambers; unrestricted passage means for connecting said chambers to a region of lower pressure; and means to selectively control fluid flow through said unrestricted passage means.

8. In a fluid control valve: a valve body; fluid passage means through said body; primary valve means positioned for movement within said body and adapted to occlude said passage means; secondary valve means positioned for movement within said body and arranged in cooperative relationship with said primary valve means, movement thereof being adapted to cause occlusion of said passage means, both said primary valve means and secondary valve means being arranged to move outwardly to sealing position in said valve body; a pair of chambers formed within said body, said primary and secondary valve means providing movable walls for each of said chambers; variable restricted passage means, means whereby variation thereof is controlled in response to movement of said primary and secondary valve means, for delivery of high pressure fluid to each of said chambers; unrestricted passage means for connecting said chambers to a region of lower pressure; and means responsive to the presence of liquid in a compartment to selectively control fluid flow through said unrestricted passage means.

9. In a fluid control valve: a valve body; fluid passage means through said body; primary valve means positioned for movement within said body and adapted to occlude said passage means; secondary valve means positioned for movement within said body and arranged in cooperative relationship with said primary valve means, movement thereof being adapted to cause occlusion of said passage means, both said primary valve means and secondary valve means being arranged to move outwardly to sealing position in said valve body; a pair of chambers formed within said body, said primary and secondary valve means being movable in said chambers and providing movable walls for each of said chambers; variable restricted passage means, means whereby variation thereof is controlled in response to movement of said primary and secondary valve means, for delivery of high pressure fluid to each of said chambers; unrestricted passage means for connecting said chambers to a region of lower pressure; and means responsive to the presence of liquid in a compartment to selectively control fluid flow through said unrestricted passage means.

10. A fluid flow control valve adapted to be positioned in a fluid conduit upstream from a fluid compartment comprising: a valve body; a fluid passage through said body; a movable primary valve member arranged for axial movement within said body; a movable secondary valve member spaced from said primary valve member and arranged for axial movement within said body; primary and secondary valve seats associated with the fluid inlet and outlet portions of said passage, said primary and secondary valve members being adapted for outward movement in the valve body for respective cooperation with said seats; a pair of chambers formed within said body, said primary and secondary valve members forming movable walls therefor and being axially slidable therein; sealing means intermediate said valve members and said chambers; restricted passages associated with each of said chambers and communicating with said fluid conduit upstream from said valve; unrestricted fluid passages interconnecting said chambers and a region of lower pressure; pilot valve means for controlling fluid flow through said unrestricted fluid passages; and means operable in response to the presence of liquid at a selected level in said compartment to operate said pilot valve means.

11. A fluid flow control valve adapted to be positioned in a fluid conduit upstream from a fluid compartment comprising: a valve body; a fluid passage through said body; a movable primary valve member arranged for axial movement within said body; a movable secondary valve member spaced from said primary valve member and arranged for axial movement within said body; primary and secondary valve seats associated with the fluid inlet and outlet portions of said passage, said primary and secondary valve members being adapted for outward movement in the valve body for respective cooperation with said seats; a pair of chambers formed within said body, said primary and secondary valve members forming movable walls therefor and being axially slidable therein; sealing means intermediate said valve members and said chambers; variable restricted passages associated with each of said chambers and communicating with said fluid conduit upstream from said valve, variation of said restricted passages being controlled in response to axial movement of said primary and secondary valve members in said chambers; unrestricted fluid passages interconnecting said chambers and a region of lower pressure; pilot valve means for controlling fluid flow through said unrestricted fluid passages; and means operable in response to the presence of liquid at a selected level in said compartment to operate said pilot valve means.

12. A fluid flow control valve adapted to be positioned in a fluid conduit upstream from a fluid compartment comprising: a valve body; a fluid passage through said body; a movable primary valve member arranged for axial movement within said body; a movable secondary valve member spaced from said primary valve member and arranged for axial movement within said body; primary and secondary valve seats associated with the fluid inlet and outlet portions of said passage, said primary and secondary valve members being adapted for outward movement in the valve body for respective cooperation with said seats; a pair of axially disposed cylindrical chambers formed in adjacent relationship within said body, said primary and secondary valve members forming movable walls therefore and being axially slidable therein; sealing means intermediate said valve members and the cylindrical walls of said chambers; restricted passages associated with each of said chambers and communicating with said fluid conduit upstream from said valve; unrestricted fluid passages interconnecting said chambers and a region of lower pressure; pilot valve means for controlling fluid flow through said unrestricted fluid passages; and means operable in response to the presence of liquid at a selected level in said compartment to operate said pilot valve means.

13. A fluid flow control valve adapted to be positioned in a fluid conduit upstream from a fluid compartment comprising: a valve body; a fluid passage through said body; a movable primary valve member arranged for axial movement within said body; a movable secondary valve member spaced from said primary valve member and arranged for axial movement within said body; primary and secondary valve seats associated with the fluid inlet and outlet portions of said passage, said primary and secondary valve members being adapted for outward and movement in the valve body for respective cooperation with said seats; spring means for normally urging each of said valve members into engagement with said seats; a pair of chambers formed within said body, said primary and secondary valve members forming movable walls therefore and being axially slidable therein; sealing means intermediate said valve members and said chambers; restricted passage associated with each of said chambers and communicating with said fluid conduit upstream from said valve; unrestricted fluid passages interconnecting said chambers and a region of lower pressure; pilot valve means for controlling fluid flow through said unrestricted fluid passages; and means operable in response to the presence of liquid at a selected level in said compartment to operate said pilot valve means.

14. A fluid flow control valve adapted to be positioned in a fluid conduit upstream from a fluid compartment comprising: a valve body; a fluid passage through said body; a movable primary valve member arranged for axial movement within said body; a movable secondary valve member spaced from said primary valve member and arranged for axial movement within said body; primary and secondary valve seats associated with the fluid inlet and outlet portions of said passage, said primary and secondary valve members being adapted for outward movement in the valve body for respective cooperation with said seats; spring means for normally urging each of said valve members into engagement with said seats; a pair of axially disposed cylindrical chambers formed in adjacent relationship within said body, said primary and secondary valve members forming movable walls therefore and being axially slidable therein; sealing means intermediate said valve members and the cylindrical walls of said chambers; variable restricted passages associated with each of said chambers and communicating with said fluid conduit upstream from said valve, variation of said restricted passages being controlled in response to axial movement of said primary and secondary valve members in said chambers; unrestricted fluid passages interconnecting said chambers and a region of lower pressure; pilot valve means for controlling fluid flow through said unrestricted fluid passages; and means operable in response to the presence of liquid at a selected level in said compartmnt to operate said pilot valve means.

15. A fluid flow control valve adpated for use in a liquid compartment comprising: a valve body; a passage providing an inlet to said valve body, said inlet being adapted to be connected to a fluid conduit; a cylindrical chamber formed within said body; a primary valve member arranged for movement within said chamber and forming a movable wall for one side thereof; an outlet passage from said body; a seat for said valve member intermediate said inlet and outlet passages; a secondary valve closure member normally spaced from said primary valve member and arranged for movement within said chamber intermediate said primary valve member and a closed end of said chamber thereby dividing said chamber into two portions; sealing means intermediate the cylindrical walls of said chamber and each of said members; restricted passages associated with each of said portions of said chamber and communicating with said inlet passage; unrestricted fluid passages interconnecting each of said portions of said chamber and a region of lower pressure; pilot valve means for controlling fluid flow through said unrestricted fluid passages; and means operable in response to the presence of liquid at a selected level in said compartment to operate said pilot valve means.

16. A fluid flow control valve adapted for use in a liquid compartment comprising: a valve body; a passage providing an inlet to said valve body, said inlet being adapted to be connected to a fluid conduit; a cylindrical chamber formed within said body; a primary valve member arranged for movement within said chamber and forming a movable wall for one side thereof; an outlet passage from said body; a seat for said valve member intermediate said inlet and outlet passages; a secondary valve closure member normally spaced from said primary valve member and arranged for movement within said chamber intermediate said primary valve member and a closed end of said chamber thereby dividing said chamber into two portions; sealing means intermediate the cylindrical walls of said chamber and each of said members; variable restricted passages associated with each of said portions of said chamber and communicating with said inlet passage; unrestricted fluid passages interconnecting each of said portions of said chamber and a region of lower pressure, variation of said restricted passages being controlled in response to axial movement of said primary valve member and said secondary valve closure member in said chamber; pilot valve means for controlling fluid flow through said unrestricted fluid passages; and means operable in response to the presence of liquid at a selected level in said compartment to operate said pilot valve means.

17. A fluid flow control valve adapted for use in a liquid compartment comprising: a valve body; a passage providing an inlet to said valve body, said inlet being adapted to be connected to a fluid conduit; a cylindrical chamber formed within said body; a primary valve member arranged for movement within said chamber and forming a movable wall for one side thereof; an outlet passage from said body; a seat for said valve member intermediate said inlet and outlet passages; a secondary valve closure member normally spaced from said primary valve member and arranged for movement within said chamber intermediate said primary valve member and a closed end of said chamber thereby dividing said chamber into two portions; stop means for said valve closure member spaced from said closed end of said chamber; spring means intermediate said closure member and said primary valve member for normally urging said valve member into engagement with said seat; sealing means intermediate the cylindrical walls of said chamber and each of said members; restricted passages associated with each of said portions of said chamber and communicating with said inlet passage; unrestricted fluid passages interconnecting each of said portions of said chamber and a region of lower pressure; pilot valve means for controlling fluid flow through said unrestricted fluid passages; and means operable in response to the presence of liquid at a selected level in said compartment to operate said pilot valve means.

18. A fluid flow control valve adapted for use in a liquid compartment comprising: a valve body; a passage providing an inlet to said valve body, said inlet being adapted to be connected to a fluid conduit; a cylindrical chamber formed within said body; a primary valve member arranged for movement within said chamber and forming a movable wall for one side thereof; an outlet passage from said body; a seat for said valve member intermediate said inlet and outlet passages; a secondary valve closure member normally spaced from said primary valve member and arranged for movement within said chamber intermediate said primary valve member and a closed end of said chamber thereby dividing said chamber into two portions; stop means for said valve closure member spaced from said closed end of said chamber; spring means intermediate said closure member and said primary valve member for normally urging said valve member into engagement with said seat; sealing means intermediate the cylindrical walls of said chamber and each of said members; variable restricted passages associated wtih each of said portions of said chamber and communicating with said inlet passage; unrestricted fluid passages interconnecting each of said portions of said chamber and a region of lower pressure, variation of said restricted passages being controlled in response to axial movement of said primary valve member and said secondary valve closure member in said chamber; pilot valve means for controlling fluid flow through said unrestricted fluid passages; and means operable in response to the presence of liquid at a selected level in said compartment to operate said pilot valve means.

19. In a fluid control valve, in combination: a valve body; means having a cylindrical bore forming a fluid passage through said body between the body and the outside of said bore means; valve means positioned for movement within said body and adapted to close said passage means, said valve means including a first piston member operable in said bore, a second piston member operable in said bore; means forming restricted passageways for delivery of high pressure fluid to the face of said first piston member and to the face of said second piston member; means forming relatively unrestricted passageways for connecting the spaces ahead of said piston members to a region of lower pressure; and means for controlling said unrestricted passageways whereby pressure may be allowed to accumulate ahead of said piston members for causing said valve means to close said passageway.

20. In a fluid control valve, in combination: a valve body; means having a cylindrical bore forming a fluid passage through said body between the body and the outside of the bore means; valve means positioned for movement within said body and adapted to close said passage means, said valve means including a first piston member operable in said bore, a second piston member operable in said bore; means forming restricted passageways for delivery of high pressure fluid to the face of said first piston member and to the face of said second piston member; means forming relatively unrestricted passageways for connecting the spaces ahead of said piston members to a region of lower pressure; and means for controlling said unrestricted passageways whereby pressure may be allowed to accumulate ahead of said piston members for causing said valve means to close said passageway, said restricted passageway means including a member having an orifice and a tapered stem movable relatively thereto whereby to modulate the flow of high pressure fluid therethrough.

21. In a fluid control valve, in combination: a valve body; means forming a fluid passage through said body; valve means positioned for movement within said body and adapted to close said passage means, said valve means including a first piston member, and means forming a bore having said piston member operable therein, a second piston member operable in said bore; means forming restricted passageways for delivery of high pressure fluid to the face of said first piston member and to the face of said second piston member; means forming relatively unrestricted passageways for connecting the spaces ahead of said piston members to a region of lower pressure; and means for controlling said unrestricted passageways whereby pressure may be allowed to accumulate ahead of said piston members for causing said valve means to close said passageway, said restricted passageway means including members having orifices and a tapered stem associated with each orifice and movable relative thereto for modulating the flow of high pressure fluid therethrough.

22. In a fluid control valve, in combination: means forming a valve body having a passage therethrough; valve means within said body for closing said passageway; means forming a bore within said valve body having a first piston member and a second piston member therein, said passage being formed between the bore means and body, and means forming a passageway for communicating high pressure to the face of each of said piston members; means forming a relatively unrestricted passageway for connecting the space ahead of each of said piston members to a region of lower pressure; and means to control the flow of fluid through said unrestricted passageway to cause pressure to accumulate ahead of said piston members whereby either of said piston members may cause said valve means to close said passageway.

23. In a fluid control valve, in combination: means forming a valve body having a passage therethrough; valve means within said body for closing said passageway; means forming a bore within said valve body having a first piston member and a second piston member therein, and means forming a passageway for communicating high pressure to the face of each of said piston members; means forming a relatively unrestricted passageway for connecting the space ahead of each of said piston members to a region of lower pressure; and means to control the flow of fluid through said unrestricted passageway to cause pressure to accumulate ahead of said piston members whereby either of said piston members may cause said valve means to close said passageway, said first passageway means comprising a relatively adjustable stem and orifice member associated with the face of each piston member, one of the stems being hollow and having the other stem disposed therein, and each stem having a taper whereby to modulate the flow of high pressure fluid to its respective piston member as it moves in valve closing direction.

24. In a fluid control valve: a valve body; means forming a bore within said body; fluid passage means through said body on the outside of said bore means; primary valve means positioned for movement within said body and adapted to occlude said passage means; secondary valve means positioned for movement within said body and arranged in cooperative relationship with said primary valve means, movement thereof being adapted to cause occlusion of said passage means; both said primary valve means and secondary valve means being arranged to move outwardly to sealing position in said valve body; chamber means formed within said body in association with said primary and secondary valve means; and means to control the pressure in said chamber means to control the operation of said primary valve means and secondary valve means.

References Cited in the file of this patent

UNITED STATES PATENTS

| | | |
|---|---|---|
| 1,359,187 | McLaughlin | Nov. 16, 1920 |
| 1,435,067 | Hurst | Nov. 7, 1922 |
| 1,871,044 | Crosthwait et al. | Aug. 9, 1932 |
| 2,477,186 | Koehler | July 26, 1949 |
| 2,528,499 | Davies | Nov. 7, 1950 |
| 2,619,108 | Sweeney | Nov. 25, 1952 |
| 2,630,822 | Davies | Mar. 10, 1953 |
| 2,661,761 | Samiran | Dec. 8, 1953 |
| 2,683,580 | Griswold | July 13, 1954 |
| 2,750,954 | Russell | June 19, 1956 |